United States Patent [19]
Rainbow et al.

[11] Patent Number: 5,551,815
[45] Date of Patent: Sep. 3, 1996

[54] STANCHION FOR SUPPORTING MOVING AND LOADING/UNLOADING HIGHWAY SEMI-TRAILERS ON RAIL CARS

[75] Inventors: Terence H. Rainbow, Erie, Pa.; James Long, Ripley, N.Y.

[73] Assignee: General Electic Company, Erie, Pa.

[21] Appl. No.: 369,221

[22] Filed: Jan. 6, 1995

[51] Int. Cl.⁶ .................................................. B60P 7/13
[52] U.S. Cl. .............................. 410/58; 410/56; 414/333
[58] Field of Search .............................. 410/54, 56, 57, 410/58, 59, 60, 61, 62, 63, 64, 104, 105; 414/333

[56] References Cited

U.S. PATENT DOCUMENTS

| | | | |
|---|---|---|---|
| 2,916,238 | 12/1959 | Fahland | 410/58 |
| 3,370,550 | 2/1968 | Gutridge et al. | 410/62 |
| 3,603,544 | 9/1971 | Griffith | 410/56 |
| 3,854,423 | 12/1974 | Bridge | 105/368 |
| 4,230,431 | 10/1980 | Stoller et al. | 410/59 |
| 4,718,800 | 1/1988 | Engle | 410/61 |
| 4,743,150 | 5/1988 | Hlinsky | 410/56 |
| 5,017,065 | 5/1991 | Krug et al. | 410/58 |
| 5,112,172 | 5/1992 | Engle | 410/64 |

OTHER PUBLICATIONS

Fruehauf Corp. Brochure, 2500–C–1113; 8 pages, Oct./1963.

Primary Examiner—Karen B. Merritt
Assistant Examiner—Gregory A. Morse
Attorney, Agent, or Firm—Marvin Snyder

[57] ABSTRACT

A stanchion or hitch for supporting a semi-trailer on a rail car includes a vertical support member having a base end and a top end with a fifth wheel attached to the top end. A base member is attached to the base end of the vertical support member. The base member includes a plurality of releasable connectors for attaching the base member to the bed of the rail car. The fifth wheel is pivotably attached to the vertical support member and includes a king pin protruding from a lower surface for enabling the fifth wheel to be coupled to a fifth wheel on a yard tractor. A diagonal brace extends between the base member and the vertical support member to prevent collapse of the vertical support member. The rail car bed is modified to accept the connectors on the base member in multiple positions so that the stanchion is selectably positionable at various locations on the rail car.

8 Claims, 5 Drawing Sheets

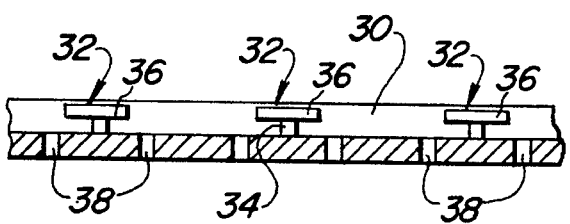
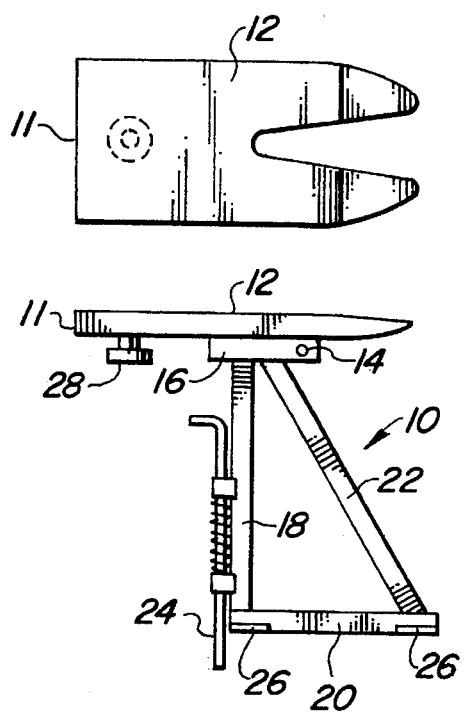
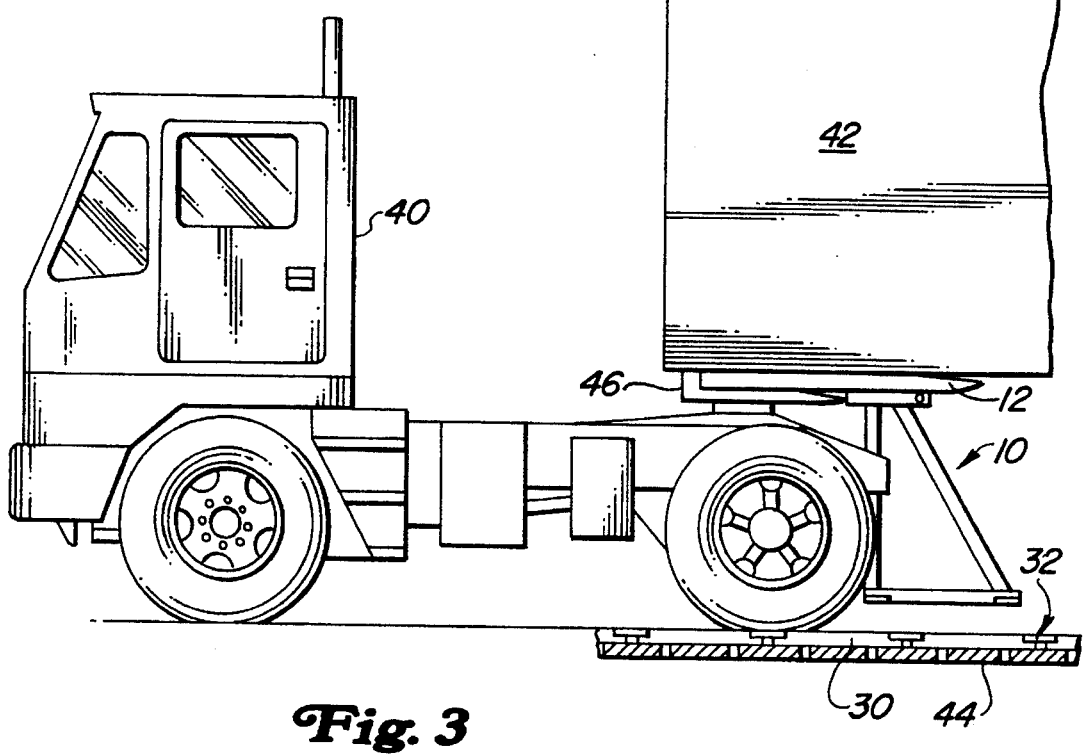

5,551,815

STANCHION FOR SUPPORTING MOVING AND LOADING/UNLOADING HIGHWAY SEMI-TRAILERS ON RAIL CARS

BACKGROUND OF THE INVENTION

The present invention relates to rail cars for carrying semi-trailers and, more particularly, to an improved stanchion and method of attachment of such stanchions to rail cars.

A preferred method of transport of semi-trailers over long distances is to load such trailers onto railroad flat cars (rail cars) and carry large numbers of such trailers on a single train of rail cars. Rail cars tend to be standardized into selected lengths, e.g., 56 feet and 90 feet. Trailers come in various lengths including short lengths of 28 feet and longer lengths of 60 feet as well as various lengths in between. Rail cars have been built to accommodate different lengths of trailers by combinations of rail cars in what is commonly referred to as articulated rail cars. Typically, three cars of 50–60 feet length each are joined to create one articulated rail car having a length of between about 150 and 180 feet. Stanchions are attached to the beds of these rail cars to allow trailers to be loaded at fixed positions on the cars. Depending upon the length of the trailers, various amounts of unused space will exist between these trailers. This unused space lowers car utilization and also increases wind resistance which reduces fuel economy.

SUMMARY OF THE INVENTION

It is an object of the present invention to provide an improved system for positioning semi-trailers on rail cars so as to maximize car-utilization and improve fuel economy.

In an illustrative embodiment, an improved stanchion for use on rail cars is adjustably positionable on the rail car to improve rail car utilization. The stanchion incorporates a conventional fifth wheel attachment allowing it to be coupled to a conventional highway semi-trailer. The fifth wheel attachment includes a king pin extending downward from a bottom surface. This king pin is substantially identical to a king pin extending downward from a trailer for attachment to a fifth wheel. The bottom surface of the stanchion's fifth wheel is thus adapted to mate with a fifth wheel on a conventional yard tractor or hostler used to load semi-trailers on a rail car whereby the stanchion can be lifted and transported by such hostlers.

The improved stanchion includes a vertical support having a length to support a semi-trailer in a level position on a rail car. The vertical support attaches to a horizontal base member and a diagonal brace extends between the vertical support and base member to prevent the vertical support from collapsing under transverse loads. Preferably, the stanchion fifth wheel is pivotally mounted to the upper end of the vertical support to facilitate its lifting and transport by the hostler. Further, the stanchion fifth wheel is longer than a conventional fifth wheel to allow the base member to clear the hostler's axle.

The base member includes a plurality of fastening devices for attaching the stanchion to a rail car. In one form, the base member includes a plurality of tenons designed to seat in a plurality of mortises on a rail car bed. A locking apparatus attaches the stanchion to the rail car once the stanchion is in place. In another form, the stanchion may include a plurality of split, horizontally extending feet on the base member which slide under mating devices on the rail car. In yet another form, the stanchions are fitted with conventional cargo clamps of the type used to hold cargo containers on flatbed rail cars. In every instance, the stanchion is positionable on the rail car bed so as to maximize utilization of the available rail car surface.

BRIEF DESCRIPTION OF THE DRAWINGS

For a better understanding of the present invention, reference may be had to the following detailed description taken in conjunction with the accompanying drawings in which:

FIGS. 1A and 1B are side and top views, respectively, of a stanchion in accordance with the present invention;

FIG. 2 is a partial cross-sectional view of a rail car floor adapted for use with the stanchion of FIGS. 1A–1B;

FIG. 3 illustrates a yard tractor using the inventive stanchion for moving a semi-trailer into loading position on a rail car;

DETAILED DESCRIPTION OF THE INVENTION

Figure 4:
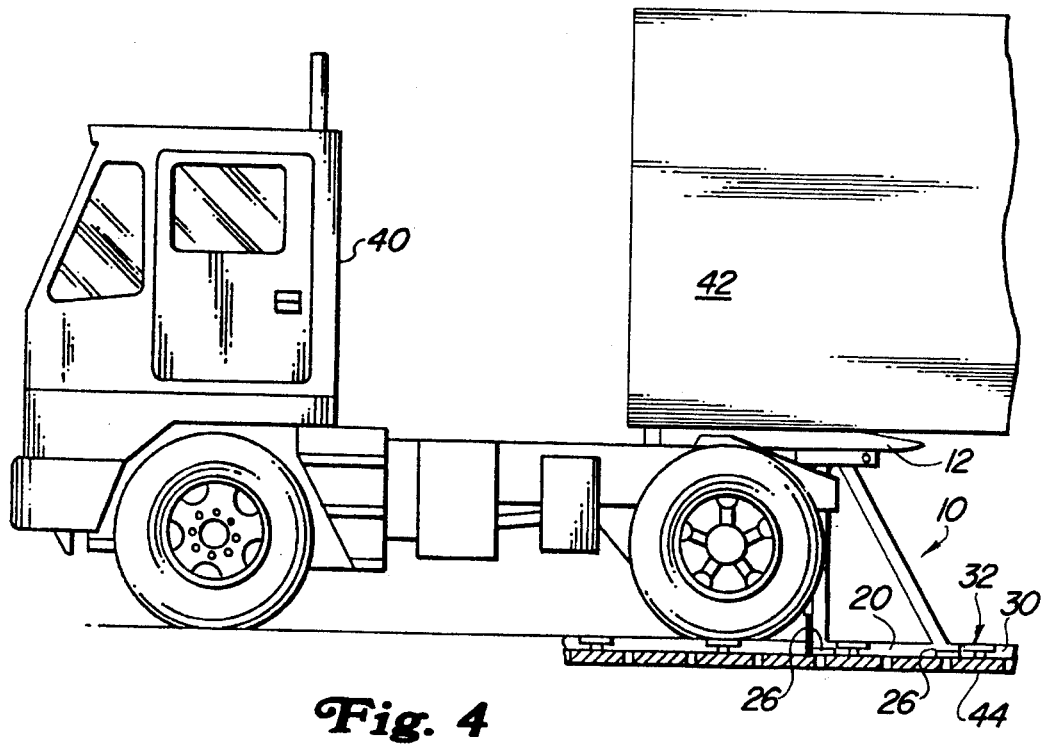
FIG. 4 illustrates the stanchion of FIGS. 1A–1B in position for attachment to a rail car.

FIG. 1A is a side view of one form of a stanchion 10 constructed in accordance with the invention, showing a fifth wheel 12 of a conventional type attached by a pivot pin 14 to a plate 16 at the top of the stanchion. Plate 16 is supported by a vertical support member 18 extending between plate 16 and a base member 20. A diagonal strut 22 is connected between plate 16 and an end of base member 20 distal from the connection point between vertical support member 18 and base member 20. Members 18, 20 and 22 may be welded or bolted together in a manner well known in the art and attached to plate 16 in a similar manner. A pin or locking bolt 24 is attached to the leading edge of vertical support member 18 and provides means for attaching the stanchion to a rail car. Also attached to base member 20 are a plurality of clevis-shaped feet or members 26 which are adapted to slidingly engage mating members on a rail car surface. A top view of fifth wheel 12, as shown in FIG. 1B, reveals that it has essentially the same construction and configuration as a conventional fifth wheel used on a tractor for a semi-trailer, except that the length of fifth wheel 12 has been extended at its leading end 11. The extension assures that support members 18 will clear the axle of the yard tractor or hostler picking up the stanchion when it latches into the fifth wheel 12. A separate king pin 28 attached to the bottom of fifth wheel 12 is substantially identical to the king pin employed on the undersides of semi-trailers. When the yard tractor or hostler backs into the stanchion in order to pick it up, the fifth wheel on the yard tractor engages king pin 28 in the same manner that the fifth wheel on a tractor would engage a similar king pin on the front end of a trailer.

FIG. 2 is a simplified cutaway view of the floor of a rail car in which there is provided a slot 30 having a number of spaced retainers 32 positioned therein. Each of retainers 32 includes a shaft 34 supporting an enlarged head 36. When stanchion 10 of FIGS. 1A and 1B is positioned on the floor of the rail car, the stanchion base members slip into slot 30; thereafter, a sliding movement of stanchion 10 will cause clevis-shaped members 26 (FIG. 1A) to slip under retainers 32 to prevent vertical movement of the stanchion. Pin (FIG.

1A) is then inserted into one of holes 38 in the rail car bed which prevents the stanchion from sliding in a horizontal direction. The stanchion is thus fixed in place since vertical movement is prevented by retainers 32 acting against members 26 and horizontal movement is prevented by pin 24 being positioned in one of mounting holes 38. By positioning a plurality of retainers 32 in slots extending along the length of a rail car, the position of a stanchion 10 can be adjusted on the rail car to accommodate any size of semi-trailer and thus to maximize utilization of the rail car.

Figure 5:
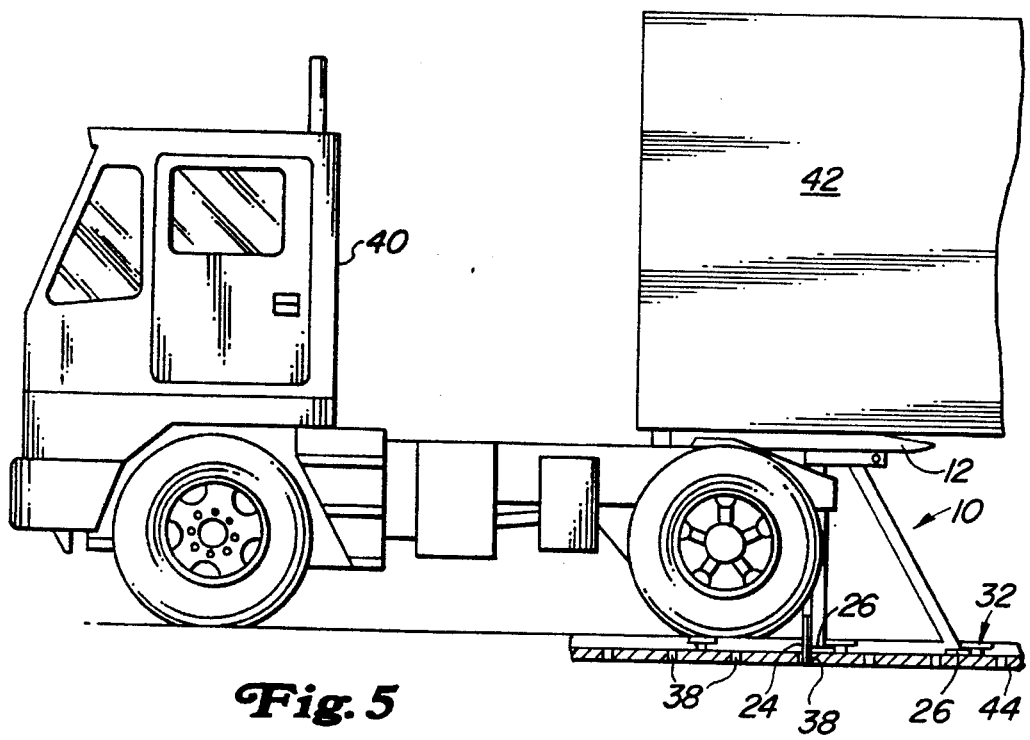
FIG. 5 illustrates the stanchion of FIGS. 1A–1B in its attached position on a rail car.

FIGS. 3, 4 and 5 show use of a yard tractor or hostler 40 for positioning a semi-trailer 42 onto a rail car floor 44. In FIG. 3, tractor 40 is shown positioning trailer 42 with stanchion 10 attached to the trailer. It will be noted that fifth wheel 46 of tractor 40 is engaged with the lower surface of the extended length fifth wheel 12 on stanchion 10. In FIG. 4, the hostler is shown after having lowered its fifth wheel, which is hydraulically powered, to a point at which base 20 of stanchion 10 is now residing in slot 30. As shown in FIG. 5, tractor 40 has backed the trailer slightly, sliding stanchion 10 along rail car floor 44 until clevis-shaped members 26 have slid underneath retainers 32. At this point, pin 24 is free to slide down into one of slots 38 under gravitational or, more preferably, spring-loaded force, thereby preventing the stanchion from moving forward and holding it in a horizontal position. The fifth wheel of the tractor is then disconnected from fifth wheel 12 using the conventional retaining and release mechanism on such tractors. In this manner, stanchion 10 can be adjustably positioned on the floor of a rail car so as to best utilize the available floor space.

Figure 6A:
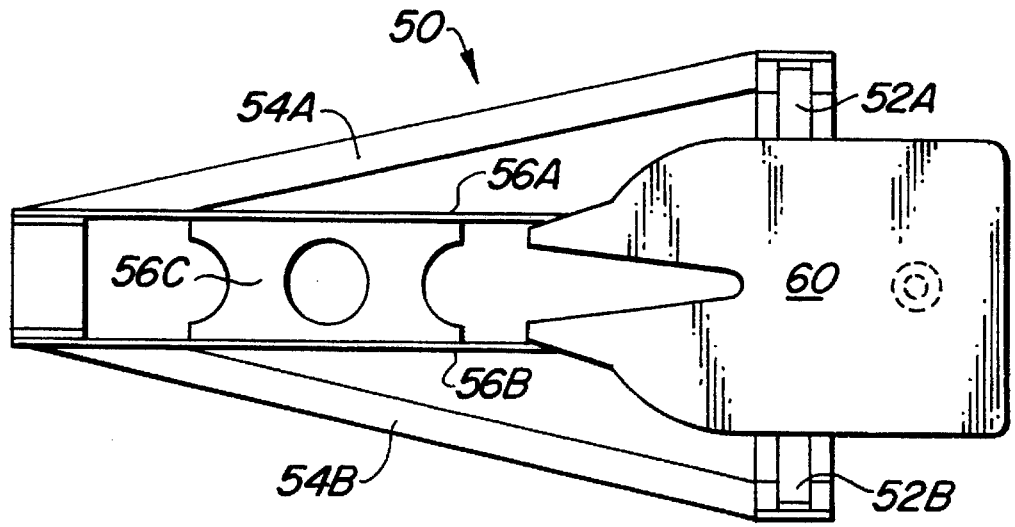
FIGS. 6A and 6B are respective top and side views of an alternate form of the stanchion of FIGS. 1A–1B.
Figure 6B:
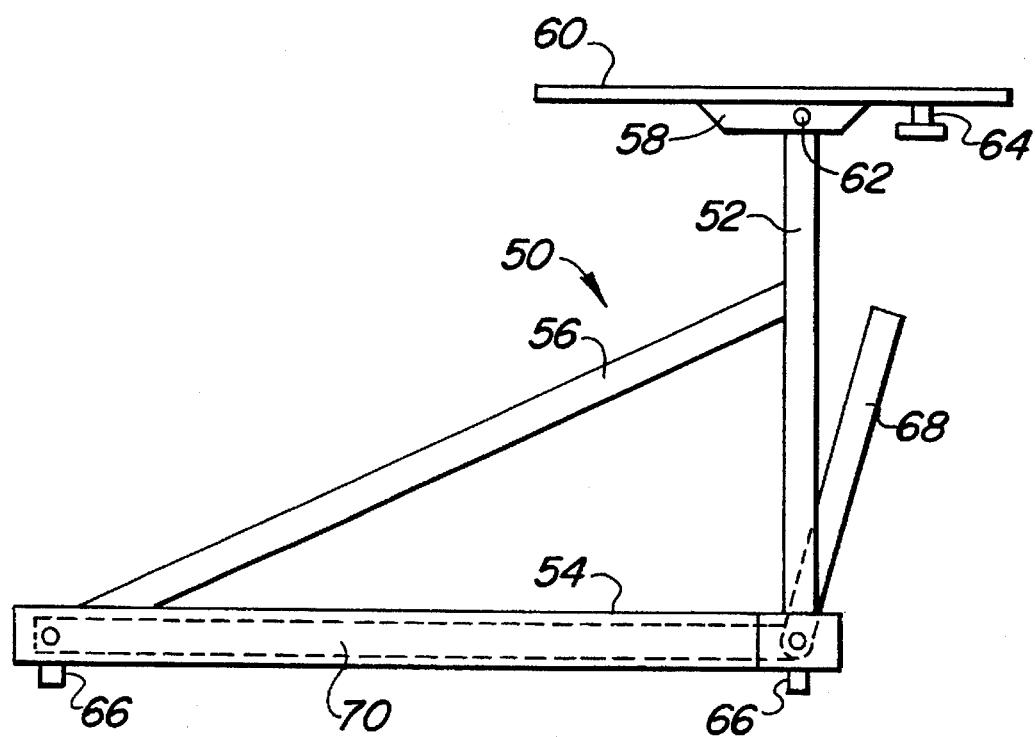
Figure 7:
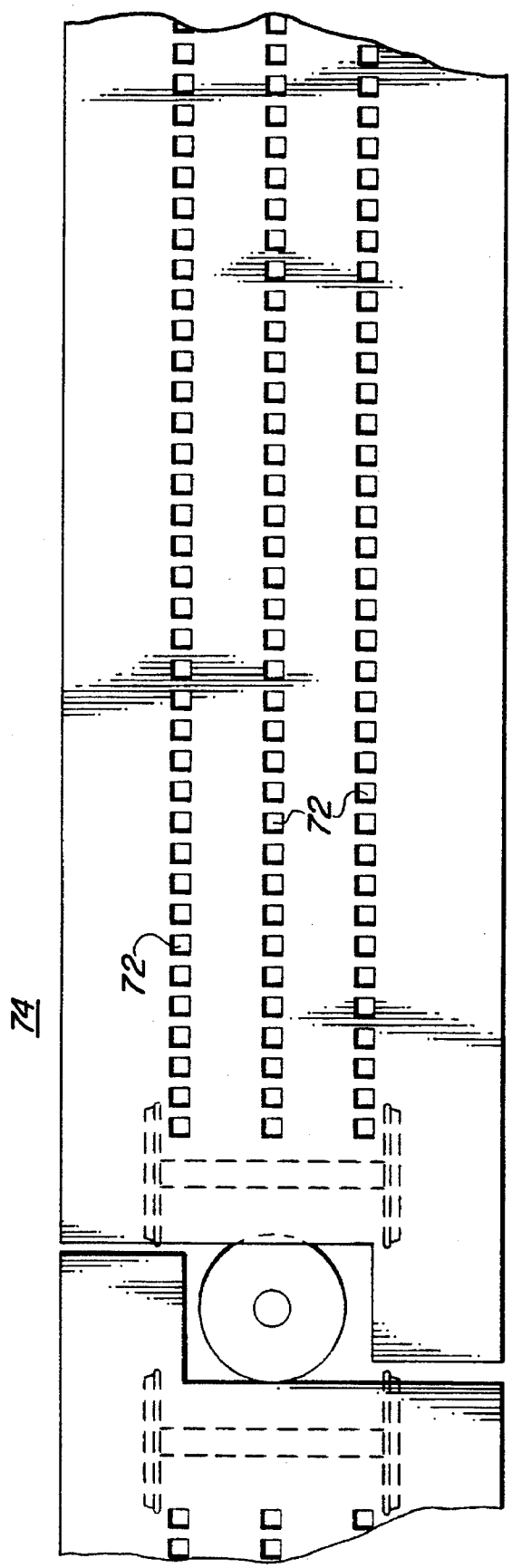
FIG. 7 is a partial top plan view of a rail car adapted for use with the stanchion of FIGS. 6A–6B.

FIGS. 6A and 6B, in conjunction with FIG. 7, illustrate an alternative type of movable stanchion 50 having essentially the same construction as stanchion 10 of FIG. 1A but being in the form of a tripod and having a different type of locking mechanism. Stanchion 50, as shown in FIG. 6B, includes a vertical support 52, a base member 54 and a diagonal strut 56. A plate 58 resides on the top end of vertical support 52 and a fifth wheel 60 is pivotally attached to plate 58 by a pivot pin 62. A king pin 64 on the underside of fifth wheel 60 is substantially identical to pin 28 of FIG. 1A and provides the same function, i.e., a connection point for the fifth wheel on a yard tractor or hostler. FIG. 6A, a top view of stanchion 50, shows that base member 54 comprises a pair of diagonally extending elements 54A and 54B and a pair of vertically extending supports 52A and 52B. Diagonal support 56 comprises a pair of opposite side elements 56A and 56B joined together by an intermediate support 56c. As with stanchion 10 of FIG. 1A, stanchion 50 may be assembled by bolting or welding the connections.

Stanchion 50 is attached to the rail car bed through a plurality of spaced apart latches or hooks 66 which can be moved between open and closed positions by operation of a lever arm 68. The method of opening or closing latches or hooks 66 may be by use of cams operable by lever arm 68 through an extension arm 70. In one form, latches 66 may be type CTC2100 Automatic Container Locks available from Peck and Hale Cargo Securing Systems. Methods of operating this type of automatic container lock are well known and such locks are commonly used in rail car securing systems for holding wheelless cargo containers to the bed of a rail car.

FIG. 7 is a partial top plan view of an articulated rail car 74 adapted for use with stanchion 50 of FIGS. 6A and 6B. Rail car 74 is provided with a plurality of uniformly spaced apertures 72 that are arranged to be capable of accepting latches 66 when stanchion 50 is placed on the rail car. By utilization of apertures 72, stanchion 50 can be positioned at any desired location on the rail car bed, thus allowing the rail car to be used to maximum advantage. Apertures 72 are preferably shaped to accept latches 66 in a manner such that the latches grasp the sides of apertures 72 to restrain the stanchion on the rail car bed. For example, apertures 72 may be undercut to provide a binding surface for latches 66 or the apertures may include crossbars extending through the apertures to which latches 66 can engage.

Figure 8:
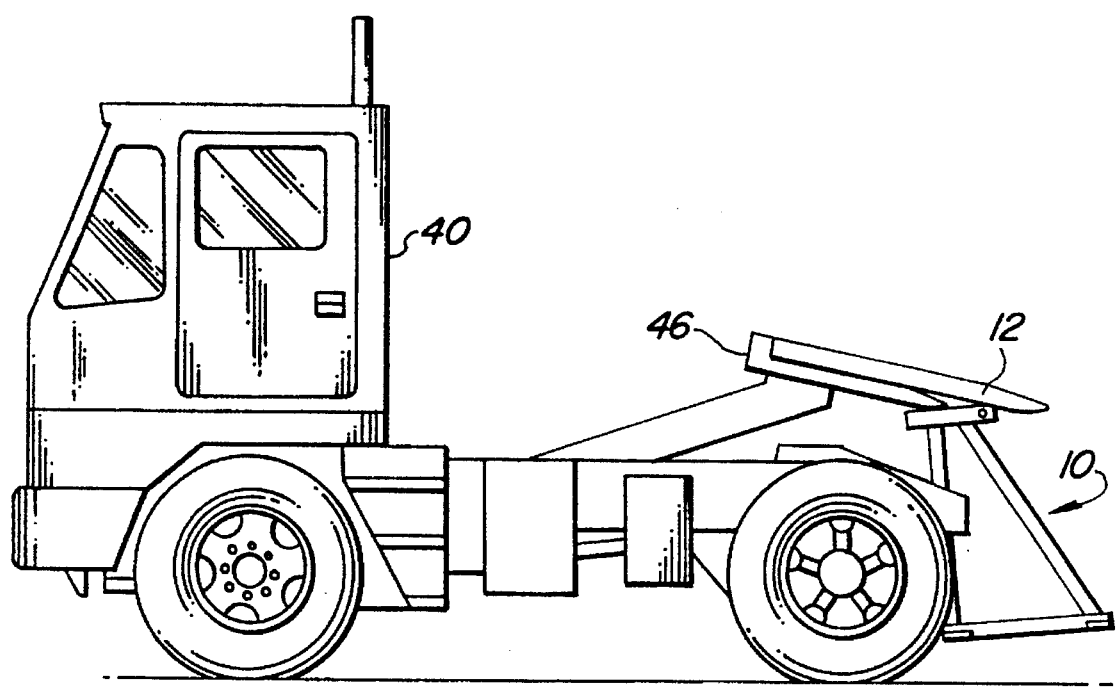
FIG. 8 illustrates transport of a stanchion in accordance with the present invention.

FIG. 8, is a side view of stanchion 10 (or stanchion 50) as it is being lifted and transported by hostler 40. The hostler includes a fifth wheel 46 which engages the fifth wheel 12 (or 60) and is therefore able to lift and move the stanchion. Since the fifth wheel on top of the stanchion, such as for example, fifth wheel 12, is pivotally attached to the stanchion, the stanchion is able to pivot outward so that it does not interfere with the axle or rear portion of hostler 40.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A stanchion for supporting a semi-trailer on a rail car comprising:

a vertical support member having a base end and a top end;

a fifth wheel pivotably attached to said top end of said vertical support member;

a base member attached to said base end of said vertical support member, said base member including a plurality of releasable connection means for attaching said base member to a rail car bed; and a pin protruding from a lower surface of said fifth wheel for enabling said fifth wheel to be coupled to a fifth wheel on a yard tractor.

2. The stanchion of claim 1 including at least one diagonal brace extending between said base member and said vertical support member.

3. The stanchion of claim 1 wherein said releasable connection means comprises a plurality of clevis shaped feet, each one of said feet being adapted to engage a headed retainer on a rail car bed and said base member further includes a vertically actuatable pin for insertion into an aperture in the rail car bed to prevent horizontal movement of the stanchion on the rail car bed.

4. The stanchion of claim 1 wherein said releasable connection means comprises a plurality of hooks, each of said hooks being movable between an open and a closed position, said hooks being attached to said base member and each of said hooks having a locking end adapted to be inserted into a respective mating aperture on the rail car bed.

5. The stanchion of claim 4 including a lock and release lever pivotally coupled to said base member adjacent said vertical support member, a horizontally extending rod coupled to said lever and adapted to move horizontally in response to pivoting motion of said lever, said rod being coupled to said hooks for locking and releasing said hooks.

6. The stanchion of claim 5 wherein said lever is positioned to be actuated to release said hooks when the stanchion is engaged with a yard tractor.

7. The stanchion of claim 1 wherein said top end of said vertical support member includes a plate affixed thereto, said plate including the pivotable attachment of said fifth wheel to said top end of said vertical support member at said plate.

8. The stanchion of claim 7 including at least one diagonal brace extending between said base member and said vertical support member.

\* \* \* \* \*

UNITED STATES PATENT AND TRADEMARK OFFICE
CERTIFICATE OF CORRECTION

PATENT NO. : 5,551,815

DATED : September 3, 1996

INVENTOR(S) : Terence H. Rainbow and James Long

It is certified that error appears in the above-identified patent and that said Letters Patent is hereby corrected as shown below:

On the Title page, please correct the spelling of the name of the Assignee to --General Electric Company--.

Signed and Sealed this

Third Day of December, 1996

*Attest:*

BRUCE LEHMAN

*Attesting Officer*     *Commissioner of Patents and Trademarks*